May 23, 1961  D. S. COOK  2,985,800
SAFETY LOCK-OUT ARRANGEMENT FOR PORTABLE
ELECTRIC POWERED EQUIPMENT
Filed April 3, 1959  2 Sheets-Sheet 1

INVENTOR.
Donald S. Cook
BY

United States Patent Office 2,985,800
Patented May 23, 1961

2,985,800

SAFETY LOCK-OUT ARRANGEMENT FOR PORTABLE ELECTRIC POWERED EQUIPMENT

Donald S. Cook, 31 Hiawatha Ave., Westerville, Ohio

Filed Apr. 3, 1959, Ser. No. 804,014

1 Claim. (Cl. 317—13)

My invention relates to a safety lock-out arrangement for portable electric powered equipment. It has to do, more particularly, with a lock-out arrangement for a portable electric powered unit of the type which receives its power from plugging into an outlet whereby the unit will not start automatically upon plugging it in even if the control switch thereof is in "on" position.

The invention will be described with particular reference to a floor polishing unit of the portable type but it will be understood that it is not limited thereto.

A floor polisher of this type usually comprises a housing which is moved along and controlled by means of an attached handle, the housing having mounted therein the floor-engaging brushes or pads which are positively driven by an electric motor. The motor is controlled by a switch on the handle which is usually of the type that it can be locked in energized or "on" position. When the machine is being used, the operator usually locks the control switch in "on" position and sometimes the plug is pulled from the outlet with the switch locked in "on" position. Therefore, as soon as the plug is inserted in an outlet, the machine might move away from the operator out of control and serious accidents have occurred in this manner.

According to my invention, I provide a control circuit in an electric powered unit of the type indicated which includes a lock-out circuit that will prevent operation of the unit when it is plugged in even if the control switch thereof is in "on" position without first actuating the control switch again to reset the lock-out circuit.

The invention is illustrated in the accompanying drawings in which.

Figure 1:
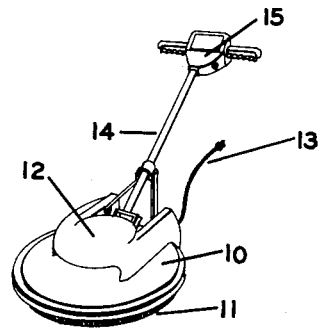
Figure 1 is a perspective view showing a floor polisher machine to which my invention may be applied.

With reference to the drawings, I have illustrated in Figure 1 a floor polishing machine to which my invention may be applied. The machine comprises a housing 10 which carries the floor engaging brushes or pads 11 that are driven in the usual manner by a motor 12. The motor receives its power by means of a cord which has a plug 13 on its outer end that plugs into the usual electric outlet. The movement of the machine is controlled by an operator by means of the rearwardly and upwardly extending handle 14 which is attached at its lower end to the housing 10. At its upper end the handle carries the main control switch in a housing 15. The housing 15 may also contain a relay forming a part of the control circuit of the machine which will be described later.

Figure 2:
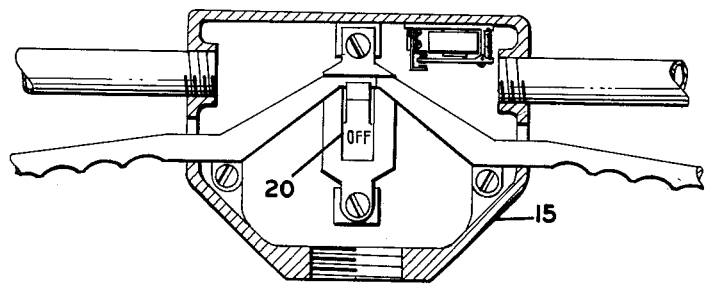
Figure 2 is an enlarged view of the control switch on the machine.
Figure 3:
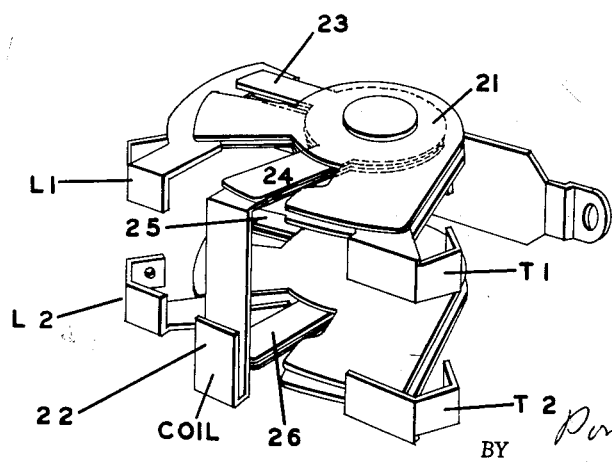
Figure 3 is a perspective view showing the contacts of the switch.
Figure 4:
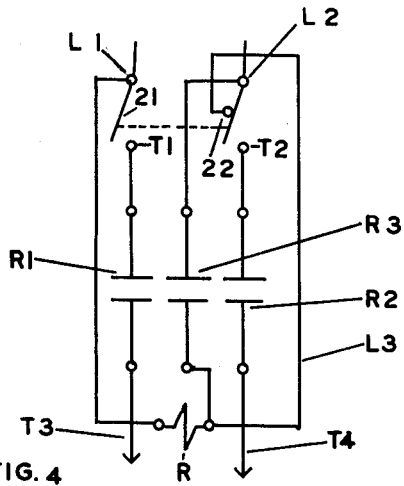
Figure 4 is a diagram of the circuit used on the floor polisher machine according to my invention, showing the condition of the circuit when the machine is not plugged in with its control switch in "off" position.
Figure 6:
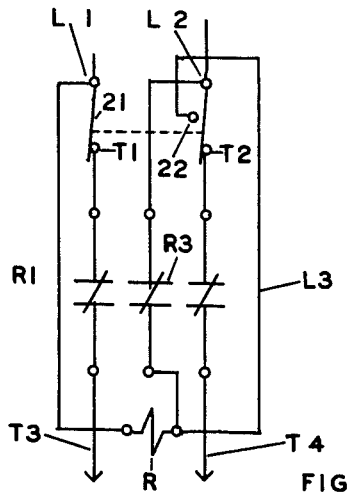
Figure 6 is a view similar to Figure 5 but showing the condition of the circuit with the switch in "on" position and with the machine plugged in, so that the machine is operating.
Figure 5:
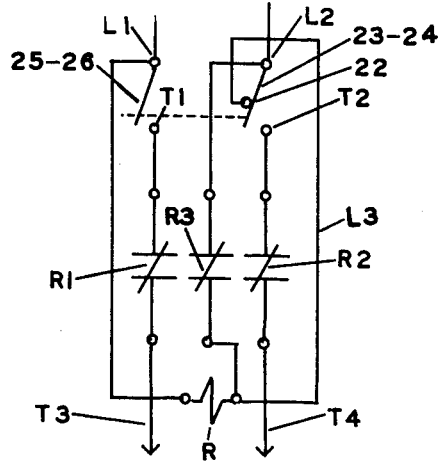
Figure 5 is a view similar to Figure 4 showing the machine plugged in but with the switch in "off" position.
Figure 7:
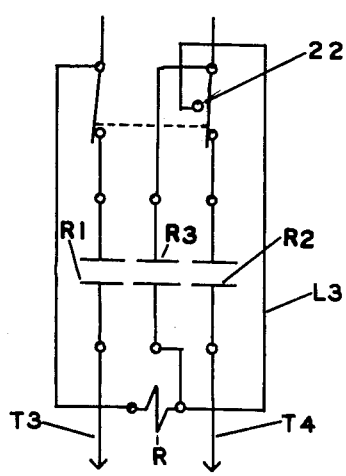
Figure 7 shows the circuit in the condition caused by the switch being in the "on" position but with the lock-out circuit set to prevent operation of the machine until resetting by operating the switch.

The switch parts within the housing 15 are shown best in Figures 2 and 3. The switch is controlled in the usual manner by a toggle lever 20 which is connected in the usual way (not shown) to a rotatable contact member 21. The switch includes the terminals $L_1$ and $L_2$ which are connected to the power lines, and the terminals $T_1$ and $T_2$ which are connected to a relay that controls the motor 12, and each of these terminals is part of a fixed contact. Another fixed contact and terminal member 22 is provided between the terminals $L_1$ and $T_1$ for connection to the control relay. The rotatable contact member 21 has the two upper radially extending contact arms 23 and 24 and the two lower radial contact arms 25 and 26. In the "off" position shown in Figure 3, the contact arm 23 engages the contact and terminal $L_1$ and the arm 24 engages the contact and terminal 22 and the arms 25 and 26 engage no contacts. In the "on" position, the member 21 is rotated so that the arm 23 is still in engagement with $L_1$ and the arm 24 is in engagement with the contact and terminal $T_1$ and the arm 25 is engaged with the contact $L_2$ with the arm 26 engaged with the contact $T_2$. In the circuit shown diagrammatically in Figures 4, 5, 6 and 7, the switch is indicated in Figures 4 and 5 as being in the "off" position shown in Figure 3. Figures 6 and 7 indicate the switch as being in the "on" position.

In the diagram of the circuit shown in Figures 4 to 7, all the contacts on the member 21 of the switch are indicated ganged and are designated generally as 21. The control relay for the lock-out circuit includes the coil R and the sets of relay contacts $R_1$, $R_2$ and $R_3$. The contacts $R_1$ are in the line $T_3$ leading to one side of the motor 12 from the terminal $T_1$. The contacts $R_2$ are in the line $T_4$ leading from the terminal $T_2$ to the other side of the motor 12. The contact $R_3$ is in a line leading from the terminal $L_2$ and which is connected to the line $L_3$ in which the coil R is connected between the connections $L_1$ and 22.

With the control circuit as shown in Figure 4, everything is de-energized because the plug connected to contacts $L_1$ and $L_2$ is not inserted in the outlet. When the plug is inserted and the control switch is still in "off" position the circuit is in the condition shown in Figure 5. At this time, the coil R is energized by the circuit from $L_1$, through $L_3$, contact point 22, contact arms 23—24, and $L_2$. This energization of the coil R closes the relay contacts $R_1$, $R_2$ and $R_3$. However, the circuit to the motor is still broken at $T_1$ and $T_2$ since the contact arms 25—26 and 23—24 are still spaced from their respective points. Now closing the control switch to close the motor circuit at the points $T_1$ and $T_2$ as shown in Figure 6 will energize the motor. At this time, the relay coil R is energized through the point $L_1$, the relay contacts $R_3$ and the point $L_2$. The switch is still "on" in Figure 7 but the relay contacts are open and therefore the circuit to the motor is broken due to the fact that the coil R is de-energized, the circuit to it being broken due to the fact that the plug has been pulled out and there is no current flowing into the circuit at the points $L_1$ and $L_2$. However, even if current is restored at the points $L_1$ and $L_2$, the relay circuit will still function as a lock-out circuit, due to the fact that the coil circuit is broken both at the switch contact point 22 and at the relay contacts R₃. Therefore, the circuit to the motor is still broken at the relay contacts R₁ and R₂. To get the machine to again operate, it is necessary to reset the control switch to energize the coil R momentarily through the contact point 22 which will close the relay contacts R₁, R₂ and R₃, and restore the motor circuit. Then, if the switch is moved back to the "on" position, the condition of the circuit shown in Figure 6 will result and the machine will operate.

From the above, it will be apparent that the relay lock-out circuit provides for locking out the electric motor circuit each time the plug on the machine is removed from the power source outlet. The relay coil is de-energized at this time so that the motor circuit is broken at the relay contacts even though the control switch is in "on" position. Even if the plug is reinserted, the electric motor circuit remains de-energized until the control switch is again actuated to the "off" position which will "reenergize" the lock-out coil and close the relay contacts. Then, if the switch is again turned "on," the circuit to the electric motor will be energized through the relay contacts.

It will be apparent that the lock-out circuit will prevent accidents due to the energization of the electric motor circuit merely by reinserting the plug in the outlet when the control switch of the unit is in "on" position.

Various other advantages will be apparent.

Having thus described my invention, what I claim is:

In a portable electric-powered unit of the plug-in type having an electric driving motor and a manual control switch for the motor, said unit including an electric circuit in which said driving motor and switch are connected, a lock-out relay connected in said circuit, said circuit having connected therein first and second plug terminals through which the circuit receives power when the plug is inserted in a suitable power outlet, said switch comprising first and second movable contacts which are ganged together and are connected to the respective plug terminals and which control first and second contact terminals, said lock-out relay comprising a relay coil connected at one of its sides to the first of said plug terminals and at its other side to a third contact terminal, said second movable switch contact being selectively movable into contact with said second or third contact terminals while the first movable switch contact moves simultaneously into contact with said first contact terminal or into non-contacting relationship thereto, said lock-out relay including first, second, and third sets of normally open relay contacts, said first set being connected between said first contact terminal and one side of the motor, said second set being connected between said second contact terminal and the other side of the motor, and said third set being connected in an independent branch circuit between said second plug terminal and the said other side of said relay coil.

References Cited in the file of this patent

UNITED STATES PATENTS

| | | |
|---|---|---|
| 2,068,600 | Frese | Jan. 19, 1937 |
| 2,551,373 | Hammerly | May 1, 1951 |

FOREIGN PATENTS

| | | |
|---|---|---|
| 512,735 | Great Britain | Sept. 25, 1939 |